United States Patent [19]
Brown

[11] 3,916,929
[45] Nov. 4, 1975

[54] SELF-SEALING BREAK-AWAY FITTING
[75] Inventor: Richard Edward Brown, Franklin, Tenn.
[73] Assignee: Scovill Manufacturing Company, Waterbury, Conn.
[22] Filed: Aug. 16, 1974
[21] Appl. No.: 497,914

[52] U.S. Cl. .................. 137/68; 137/614.04; 285/4
[51] Int. Cl.² .......................................... F16K 17/40
[58] Field of Search..... 137/67, 68, 71, 614–614.06; 251/149.6, 149.7; 285/2, 4

[56] References Cited
UNITED STATES PATENTS
2,453,741  11/1948  Bopp .......................... 137/614.04 X
3,630,214  12/1971  Levering .............................. 137/68
3,719,194  3/1973  Anderson et al. ..................... 137/68
3,794,057  2/1974  Badger ................................. 137/68
3,797,510  3/1974  Torres et al. ......................... 137/68

Primary Examiner—Irwin C. Cohen
Assistant Examiner—Richard Gerard
Attorney, Agent, or Firm—Dallett Hoopes

[57] ABSTRACT

An inexpensive, fool-proof, self-sealing, break-away fitting in which parts in the halves are identical and a breaking of the housing will result in a stop of the liquid flow from either side of the fitting.

7 Claims, 5 Drawing Figures

SELF-SEALING BREAK-AWAY FITTING

BACKGROUND OF THE INVENTION

1. Field of the Invention

The invention relates to fittings especially for lines containing flammable fluids such as gasoline and is useful, for instance, in fuel lines in automobiles wherein if there is an accident and the car is badly damaged, the impact severing the fuel line will not result in spillage of the fuel out onto the surrounding area causing a fire hazard. Fittings generally similar to the one of the present invention have been used at service stations in the hose line from the fuel pump and have, for instance, protected against spillage of fuel in the event the hose is pulled away from the pump as when a driver whose tank is being filled inadvertently or otherwise chooses to drive off from the station.

2. Description of the Prior Art

Examples of such valves in the prior art are shown in Johnsen U.S. Pat. No. 2,048,387, issued July 21, 1936, and Anderson et al. U.S. Pat. No. 3,719,194, issued March 6, 1973. The Johnsen patent discloses a fitting for the hose line of the gas station pump wherein if there is a fracture of the fitting, a spring-pressed plug drives down and seals off the fitting. The Anderson et al patent discloses a coupling wherein plug elements are spring-pressed toward closure and a special trigger holds them open until the coupling is broken.

SUMMARY OF THE INVENTION

The present invention provides a simple, inexpensive, body portion having identical plugs and spring elements which is adapted for insertion in a fuel line of an automobile so that on fracture of the plastic body, the fuel line on either side of the fitting will be closed off precluding the possibility of gasoline leakage at the site.

BRIEF DESCRIPTION OF THE DRAWINGS

Features of the invention will be apparent from the following specification including the drawings, all of which disclose a preferred embodiment of the invention. In the drawings.

Figure 1:
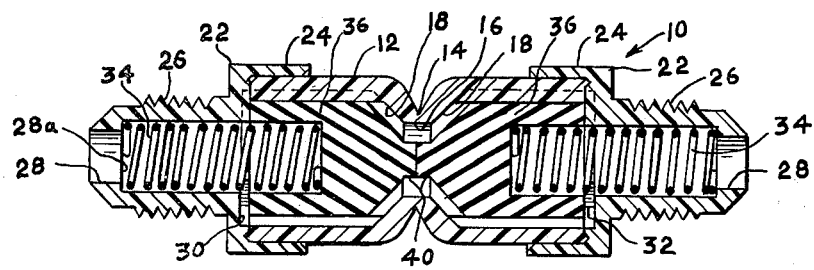
FIG. 1 is a sectional view of a complete fitting embodying the invention.

Referring more specifically to the drawings, a fitting embodying the invention is shown in FIG. 1 and generally designated 10. It comprises a body or housing portion 12 which is necked in at its center as at 14. The interior of the housing portion has a central opening 16 which is axial and is approached from either side by a frusto-conical seat surface 18.

As will be noted from the drawing, the wall of the housing portion at the neck is not only reduced in outer diameter, but also reduced in thickness at the precise narrowest diameter of the neck. Thus, the fracture of the housing at the neck upon a lateral or other stress is assured for two reasons.

Figure 5:
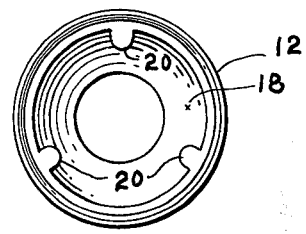
FIG. 5 is a view taken on the line 5—5 of FIG. 3.

As shown best in FIG. 5, the housing portion 12 is formed with longitudinal ridges 20 which extend inward and are uniformly spaced about the circumference of the wall. These ridges extend along the cylindrical portion of the wall up to the frusto-conical surface 18. The housing is completed by a pair of end caps 22 which have flanges 24 which fit over and are sealed to the respective ends of the housing 12. As shown, the end caps are formed with a threaded tubular boss 26 having a reduced opening 28 at the bevelled end thereof. The transverse wall 30 of each end cap is formed with radial ridges 32.

In assembly, one end of the spiral compression spring 34 is provided to extend into the boss 26 and bottom on the annular shoulder 28a adjacent the open end 28. A cup-shaped plug 36 is provided having a frusto-conical nose 38. The opening of the cup receives the opposite end of the spring 34. The frusto-conical nose 38 carries a protuberance 40.

In actual practice, the housing 12 and the end caps are molded of plastic, such as nylon, or Delrin, an acetal resin. The plugs are molded of synthetic rubber such as S.A.E. Standard 10R Grade SB715, a Nitrile compound having a durometer hardness in the 65 to 75 range. The spring is of stainless steel wire.

In assembly, the respective plugs 36 and springs 34 are inserted into the housing portion halves (FIG. 1) and the end caps 22 receive the outer ends of the spring respectively and are fitted with the flanges 24 sealed over the outer surface of the ends of the housing portion 12. In this assembly, as shown, the protuberances 40 of the two plugs interengage and the other ends of the cup-shaped plugs 36 bottom out on the ridges 32.

The structural arrangement thus provided gives high flow characteristics through the fitting. The fluid entering the opening 28 passes through the boss 26 and outward between the ridges 32 to the outside of the plug 36. Then, it flows between the ridges 20 and the plug, and between the frustoconical wall 18 and nose 38 of the plug. Thereafter, the fluid passes through the opening 16 in the annular space outside the protuberances 40 and into the chamber of the other half of the fitting through which it flows in similar fashion.

The dimensions of the plug and internal structure of the halves of the housing portion is significant: it is important that the length of the plugs be such that the protuberances 40 of one of the plugs when that plug has bottomed on the ridges 32 hold the other plug in a similar bottomed position so that while the assembly is unitary, that is, unbroken, neither of the plugs will seat on its respective frusto-conical surface 18.

Figure 2:
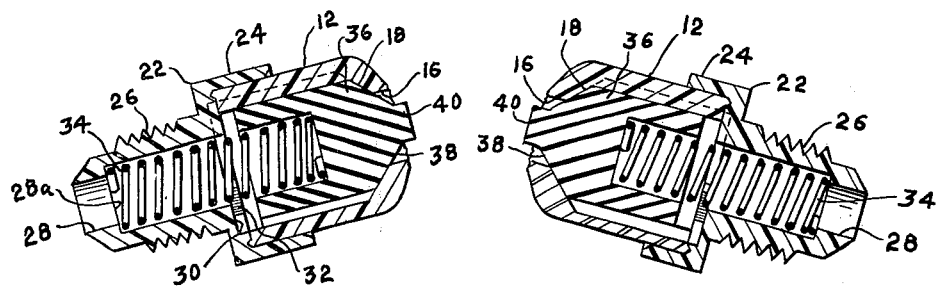
FIG. 2 is a sectional view showing the same fitting after rupture.
Figure 3:
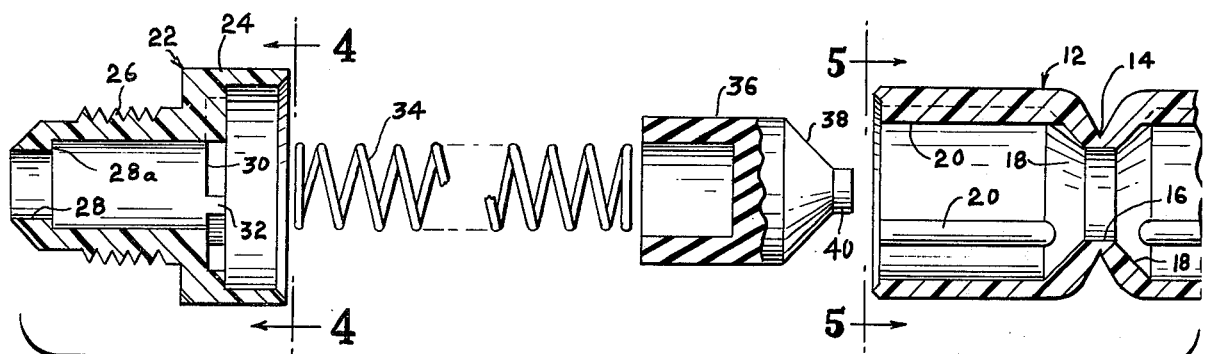
FIG. 3 is an exploded sectional fragmentary and slightly enlarged view showing the various parts.
Figure 4:
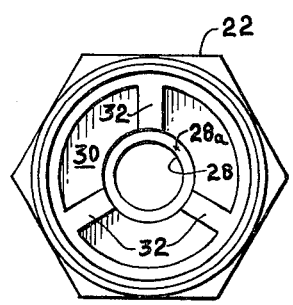
FIG. 4 is a view taken on the line 4—4 of FIG. 3.

Upon the fracture of the housing portion 12 as by a severe mechanical blow, the housing portion will break at the neck 14 (FIG. 2). The springs 34 will then respectively drive the plugs outward and their frusto-conical noses will seat on the respective frusto-conical surfaces 18, plugging the respective broken portions of the fitting so that no gasoline will flow through the openings 16.

It will be understood that to minimize gasoline spillage it may be desirable to have a number of such fittings in a car spaced along the fuel line from gasoline tank to engine. It will be clear that no matter where the fitting is positioned in the car, once the fitting is broken, fluid cannot escape from the gas line in either direction from the fitting. It should be understood, however, that the devices embodying the present invention may be used in a variety of installations, although automobile use, as described, is a preferred use.

The inexpensive and fool-proof nature of the structure described will be readily apparent. The structure may take various forms and the invention is limited only to the extent of a reasonable interpretation of the following claim language:

I claim:

1. An inexpensive, compact, self-sealing break-away fitting comprising a simple tubular molded plastic housing portion having a neck comprising a V-shaped peripheral groove with a corresponding annular rib inside the housing portion, the neck being of reduced wall thickness, the neck disposed intermediate two halves, and a pair of molded end cap portions closing either end of the housing respectively, the housing having inside it and defined by the rib an axial central opening with valve seat means closely proximate to and surrounding the opening on each side and facing the adjacent end cap portions respectively, the end cap portions having openings each adapted to be connected to a conduit, plug means disposed in each half, spring means in each half disposed compressively between the plug means and the respective and cap portion and urging the associated plug means toward engagement with the adjacent seat to close it off, the plug means fixedly carrying centrally protuberances of lesser diameter than the central opening, and shoulder means in each half limiting movement of the plug means away from the seat, whereby when the housing portions are together, the protuberances engage each other at contact surfaces to mutually hold the plug means off the seats thereby permitting flow through the fitting, but when the fitting breaks at the neck, the spring means urge the respective plug means to seat, preventing leakage.

2. A fitting as claimed in claim 1 wherein the inside of each half of the housing portion, has a plurality of inward ribs extending longitudinally from the valve seat up to the end cap portion, and adapted to center and guide the plug means.

3. A fitting as claimed in claim 1 wherein the plug means are made of rubber.

4. A fitting as claimed in claim 1 wherein the end cap portions on their inside surfaces carry radial ridges serving as said shoulder means.

5. A fitting as claimed in claim 4 wherein in each half the length of the plug means is such that the distance from the contact surface of the protuberance to the opposite end of the plug means is substantially equal to the distance between the center of the neck and the radial ridges, whereby in assembly the protuberances, acting mutually on the plug means, serve to hold the plug means away from their respective conical seats with the plug means of at least one half in engagement with its associated ridges.

6. A self-sealing break-away fitting comprising a plastic housing having identical halves joined by a reduced neck at which fracture is intended to occur, plug means in each of the halves, spring means in each of the halves urging the plug means towards a seat at said neck, protuberances on each of the plug means adapted to mutually hold the plug means away from seating condition, and shoulder means in each of the housings holding the plug means from retreating away from said seating condition farther than a position in which the tip of the protuberance is aligned with said neck, and channel means in the housing on each side of the neck permitting flow around the respective plug means, the channel means being adapted to be connected to conduit means disposed on the opposite sides of the plug means respectively from the neck, whereby, when fracture occurs, the spring means urges the plug means respectively to seat.

7. A fitting as claimed in claim 6 wherein in each half the plug means are cup-shaped and receive an end of an axial spring comprising the spring means and the channel means include a shoulder adjacent the extreme end of the fitting adapted to serve as a bottom for said spring respectively.

* * * * *